United States Patent [19]

Kwoh et al.

[11] Patent Number: 5,382,983

[45] Date of Patent: Jan. 17, 1995

[54] APPARATUS AND METHOD FOR TOTAL PARENTAL CONTROL OF TELEVISION USE

[76] Inventors: Daniel S. Kwoh, 3975 Hampstead Rd., La Canada/Flintridge, Calif. 91011; Roy J. Mankovitz, 18057 Medley Dr., Encino, Calif. 91316

[21] Appl. No.: 118,001

[22] Filed: Sep. 8, 1993

Related U.S. Application Data

[63] Continuation of Ser. No. 100,616, Jul. 29, 1993, abandoned.

[51] Int. Cl.6 .............................................. H04N 5/44
[52] U.S. Cl. .................................... 348/716; 348/5.5; 348/569; 348/705
[58] Field of Search ................ 358/349, 194.1, 192.1, 358/191.1, 188, 181; 380/20; 455/26.1; H04N 5/44; 348/734, 731, 725, 705, 569, 5.5, 716

[56] References Cited

U.S. PATENT DOCUMENTS

| | | |
|---|---|---|
| 4,425,579 | 1/1984 | Merrell ................................ 358/349 |
| 4,488,174 | 12/1984 | Krüger et al. ....................... 358/181 |
| 4,510,623 | 4/1985 | Bonneau et al. .................. 358/191.1 |
| 4,855,611 | 8/1989 | Isobe et al. ........................... 358/181 |
| 5,053,884 | 10/1991 | Kamijyo ................................. 380/20 |
| 5,253,066 | 10/1993 | Vogel ................................. 358/194.1 |
| 5,303,063 | 4/1994 | Kim et al. ........................... 348/734 |

*Primary Examiner*—Mark R. Powell
*Assistant Examiner*—Jeffrey S. Murrell
*Attorney, Agent, or Firm*—Christie, Parker & Hale

[57] ABSTRACT

An apparatus for parental control of television use by excluding or including selected programs, channels, and/or times. The apparatus includes a command controller comprising a microprocessor, a read only memory, a memory for authorized identification numbers, and a memory for storing the selected programs, channels, dates and times; a keyboard or similar apparatus for use in entering an identification code into the controller; a clock with an output as a function of time located in the television receiver; apparatus for ordering each program, date, and time into temporal order; and, apparatus for storing the selected program, date, and time in temporal order.

17 Claims, 17 Drawing Sheets

Fig. 6

PARENTAL CONTROL

THE FOLLOWING PROGRAMS ARE AVAILABLE FOR VIEWING.

4:30 PM - 5:00 PM     4     CARTOON EXPRESS (23561)

5:00 PM     11     L.A. LAKERS V. BOSTON CELTICS (0765)

6:30 PM - 7:00 PM     11     FAMILY TIES (15657)

7:00 PM - 7:30 PM     2     BEVERLY HILLBILLIES (49677)

Fig. 7

PARENTAL CONTROL

TO USE PARENTAL CONTROL FEATURE,
ENTER YOUR IDENTIFICATION (ID) NUMBER.

Fig. 8

PARENTAL CONTROL

YOU HAVE ENTERED AN UNAUTHORIZED ID NUMBER
PLEASE RE-ENTER YOUR ID NUMBER.

Fig. 9

PARENTAL CONTROL

THE ID NUMBERS ENTERED ARE NOT AUTHORIZED ID NUMBERS. THE T.V. WILL NOW BE DISABLED FOR A PERIOD OF TIME.

Fig. 10

PARENTAL CONTROL

POSSIBLE SELECTIONS        TO MAKE SELECTION-PUSH

1. PROGRAM                 1
2. CHANNEL & TIME          2
3. DATE & TIME             3
4. TIME                    4
5. REVIEW                  5
6. TO OVERRIDE FOR NORMAL
   T.V. VIEWING, PUSH      6
7. COMPARE FOR
   INCONSISTENCIES         7

APPARATUS AND METHOD FOR TOTAL PARENTAL CONTROL OF TELEVISION USE

BACKGROUND OF THE INVENTION

This is a continuation of patent application Ser. No. 08/100,616 filed Jul. 29, 1993 now abandoned.

FIELD OF THE INVENTION

This invention relates generally to the controlled use of television receivers and particularly to parental control of the use of television receivers.

PRIOR ART

Parental control is presently available in some television receivers, video cassette recorders, and cable boxes on a limited basis. In these devices, certain channels may be locked out. However, the locking out of channels does not prevent children from spending excessive time watching television instead of studying or doing other things. Other devices limit the amount of time, but do not provide for selective viewing to prevent viewing of undesirable programs. One example of parental control at the television receiver is disclosed in U.S. Pat. No. 4,510,623 to Bonnian et al. A local oscillator for electronically tuning the television is controlled by a phase lock loop which is responsive to the output signal from a microprocessor. The microprocessor provides the output signal only if the selected channel has not been inhibited. To inhibit a channel for a period of time, the user enters a lockout code which is stored in a non-volatile memory. The memory provides one input to the microprocessor which is compared to the input by a user selecting a channel to be viewed. The microprocessor determines whether the selected channel is one of the inhibited channels and, if it is, does not generate the necessary signal for tuning to that channel.

Another prior art patent that discloses the blocking out of selected channels is U.S. Pat. No. 4,718,107 to John J. Hayes. The parental control disclosed in the Hayes patent is provided in a converter box. In this system, if the access code is forgotten, the converter box has to be taken to the business office of the CATV system to have the memory purged of the blocked-out channel information and the access code, and a new access code must be entered.

In general, the present state of the art concerning parental control suffers from a number of drawbacks. In particular, the control is very limited and does not provide a parent the broad control desirable for controlling the viewing or use of a television by a child.

SUMMARY OF THE INVENTION

A principal feature of the invention concerning parental control is providing an improved system for the selection and entering of programs, channels, dates and times either to be included for viewing or excluded from viewing or controlling the use of a television receiver. In a mode of inclusion, the programs to be added may be added by using the compressed code published in newspapers or that appear on the TV schedule carried by a floppy disk or downloaded from information transmitted from a central location over a telephonic line. Compressed codes and the use thereof are disclosed in U.S. patent application Ser. No. 07/829,412 filed Feb. 3, 1992, (now U.S. Pat. No. 5,307,173) which is incorporated herein by this reference as though set forth in full. This may also be done for exclusion from availability for viewing. The compressed code has been called G-code and PlusCode in association with Gemstar Development Corporation equipment, and G-code and PlusCode are trademarks of Gemstar.

Alternatively, the G-code compressed codes that are now common in newspapers may appear in a TV schedule that is broadcast with the TV signal in the video blanking interval or from an FM broadcast of the TV schedule which is, upon receipt, decoded and stored for display when requested. When displayed, programs to be included may be selected by a cursor, or alternatively by the compressed code. Similarly, programs that had previously been selected may be removed or deleted by entering the compressed code or by using the cursor. Channels, days or dates and time may be included under the parental control mode of the system. Selected channels may be made available at any time, or may be made selectively available during designated periods of time programmed into the system. Certain days, such as Saturday and Sunday, may be permitted days of viewing or using the television, and these days may be programmed into the system under the parental control mode.

The present invention also includes the use of a remote controller that provides for downloading of information sent over telephone lines. The information sent over the telephone lines may include categories of TV programs such as children's programs, sports programs, news and so forth. The user may call a number such as a 900 number and request that the TV programs available in certain periods of time be categorized in selected categories, such as children's programs for example. A compressed code representing the selected categories is then sent over the telephone lines and downloaded into the controller or other apparatus so that categories of programs may be selected for inclusion or exclusion in the parental control mode. To include categories or exclude them, the compressed code is entered in the system by use of the keypad on either the remote controller or the television or auxiliary equipment, such as a VCR, cable box or satellite box.

Additionally, the codes for categories and subcategories of programs; such as movies—children, may be published in newspapers and magazines, broadcasted as part of a TV guide, which may be a video program or in the VBI, or the codes may be recorded on a floppy disk or a video cassette as part of a TV guide.

BRIEF DESCRIPTION OF THE DRAWINGS

FIGS. 6–10 illustrate the different displays on the screen of the TV or the display of the VCR or remote controller employing the present invention.

DESCRIPTION OF THE PREFERRED EMBODIMENT

Figure 1:
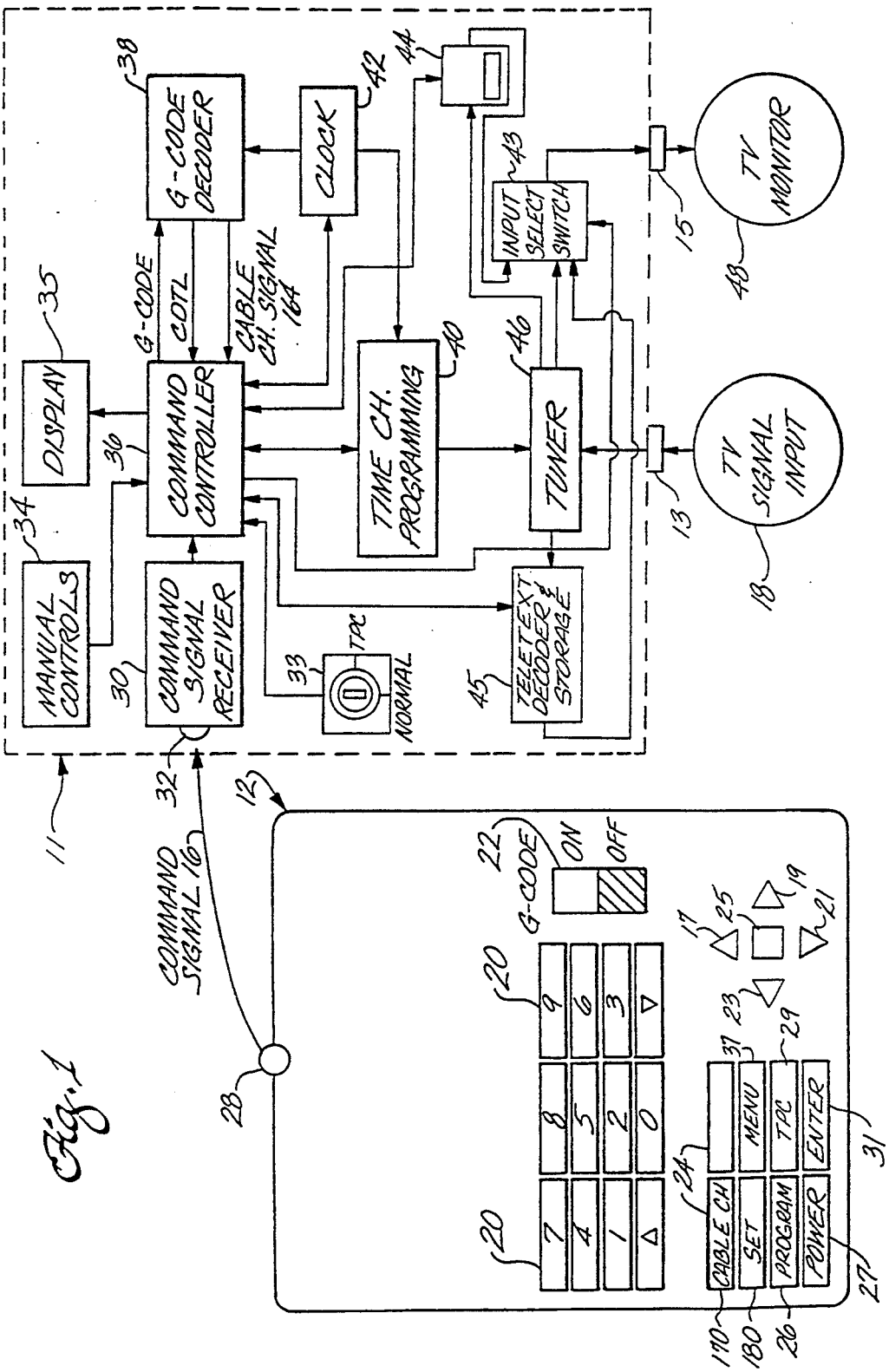
FIG. 1 is a schematic showing apparatus according to this invention with the parental control circuitry with a compressed code decoder means embedded in a video cassette recorder.
Figure 2:
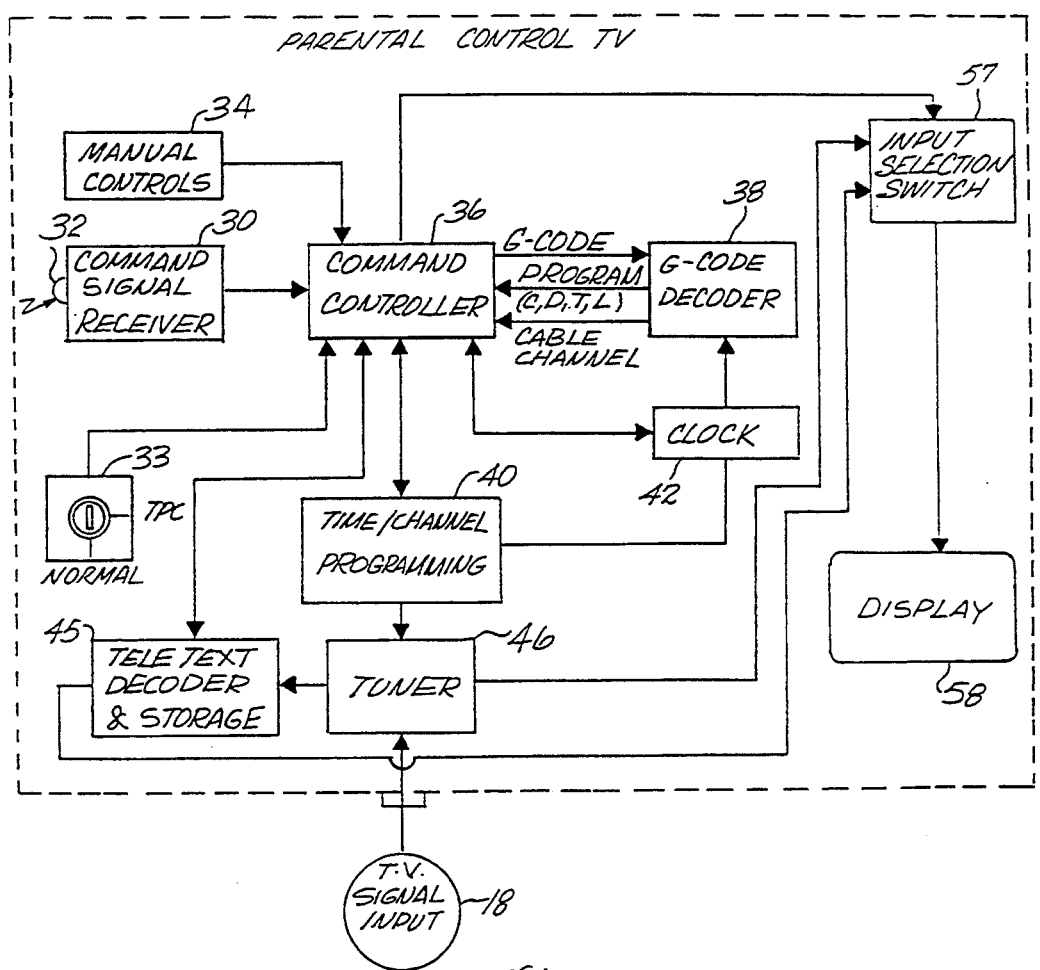
FIG. 2 is a schematic showing apparatus according to this invention with the parental control circuitry with a compressed code decoder means embedded in a television receiver.

Referring now to the drawings, there is shown in FIG. 1 a Video Cassette Recorder/Playback Unit (VCR) 11 including circuitry for providing parental control of the use of a television receiver. The circuitry is shown embedded in the VCR, however, the circuitry may be embedded in the television receiver, as shown in FIG. 2, or in some other control device such as a cable box or a satellite box. When embedded in a VCR, the circuitry is located between a television signal input 18 and a television monitor 48. The source of the television signal may be any one of the typical sources, such as, for example, an antenna, a video game player, a cable converter box, or a satellite converter box.

As part of the parental control, the VCR 11 is connected to the television signal input 18 by way of a tamper-proof connector 13 and to the television monitor 48 through a tamper-proof connector 15. When the parental control circuitry is embedded in the television receiver, as shown in FIG. 2, the tamper-proof connectors are not needed, but may be included to prevent another source from being connected to the TV. The parental control circuitry may be controlled at the apparatus by use of manual controls 34 or from a remote controller 12.

The primary components of the parental control circuitry include a command controller 36 and an input selection switch 43 (FIG. 1) or input selection switch 57 (FIG. 2). The parental control circuity permits the parent to select either by inclusion or exclusion the particular source and/or programs, channels, dates and times available for television viewing. In this way, the parent can control the content of programs watched and/or the amount of time that a child may spend watching or playing games on television rather than studying, for example. The parental control circuitry may further advantageously include a compressed code decoder 38 so that the G-code compressed code that presently appears in television calendars may be used to enter the selected program, rather than using the more laborious and time consuming approach of inputting the channel, date, time, and length of the program that is selected by the parent for inclusion or exclusion.

In a preferred embodiment, the parental control circuitry is shared by the G-code decoder circuitry, which is disclosed and described in detail in U.S. patent application Ser. No. 07/829,412.

To provide for remote control of the VCR 11, there is included in the VCR a command signal receiver 30 with a photodiode 32 which senses the command signal 16 sent from the remote controller 12 by way of an infrared light emitting diode 28 on the remote controller 12. The manual controls 34 of the VCR 11 include the input keys of the remote controller 12 and the operation of the VCR 11 will, thus, be described by use of the remote controller 12. Similarly, the television illustrated in FIG. 2 will have the input keys as shown on the remote controller 12 in its manual controls 34. Also, the television of FIG. 2 may be remotely controlled, and for this purpose includes the command signal receiver 30 and photodiode 32.

The remote controller 12 has a number of keys, which include numerical keys 20, G-code switch 22, function keys 24, program key 26, and power key 27. The remote controller 12 also includes a total parental control key 29 and an enter key 31. The remote controller may further advantageously include a cursor control having up/down keys 17 and 21, respectively, right/left keys 19 and 23, respectively, and an activate key 25. There are means in the remote controller 12 that interprets each key as it is pressed, and sends the proper command signal 16 to the video cassette recorder 11 via the infrared diode 28. Except for the G-code switch 22, the total parental control key 29, menu key 37, enter key 31 and the up/down, right/left and activate keys 17, 19, 21, 23 and 25 on the remote controller 12 in FIG. 1, the remote controller is essentially the same as any other remote controller in function. It is to be noted that the typical keys of remote controllers, such as volume control and channel selection, are not shown on the controller of FIG. 1, but would ordinarily be present.

The total parental control key 29 and enter key 31 are used when selecting programs, by title or channels, dates and time that are available for use of the television. The enter key 31 is used when entering the user's identification code that permits programming of the total parental circuitry to set up the program or channel, date, and time for a program to be available for viewing on the television receiver.

The G-code switch 22 is provided to allow the user to lock the remote controller 12 in the G-code mode while using a G-code, which is the name given to the compressed code which is the encoded CDTL information to perform easy selection of a program to be included or excluded under parental control or to be viewed by the user of the television, or to perform pre-programming for taping selected programs as disclosed in the 07/829,412 application.

Figure 3:
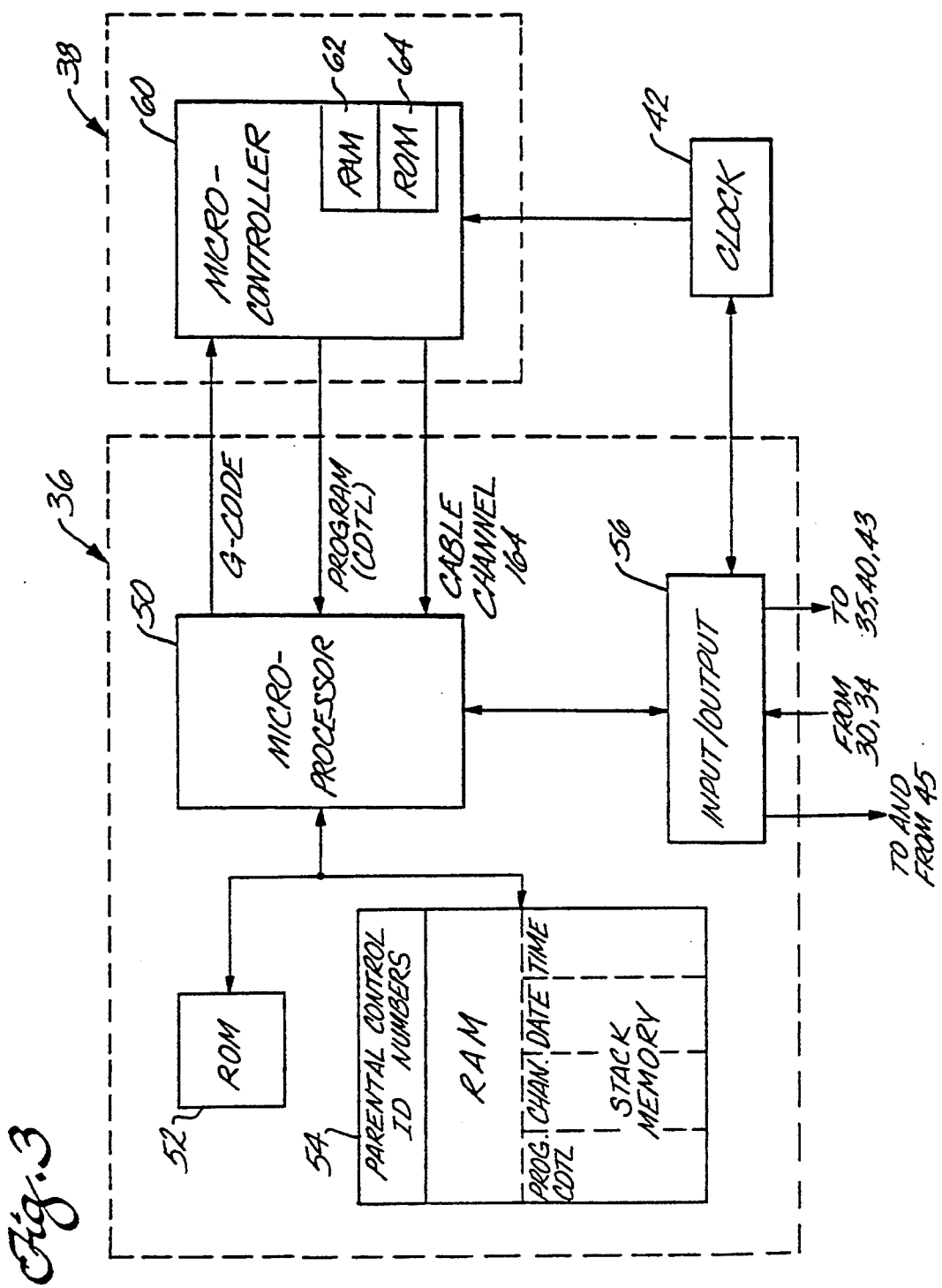
FIG. 3 is a schematic of the embedded processors and memory for parental control and compressed code decoding.

A possible realization of the command controller 36 and the G-code decoder 38 is shown in FIG. 3. The command controller 36 includes a microprocessor 50 for overall control and performing the parental control functions, a random access memory 54, a read only memory 52 for program storage, and input/output circuitry 56. This circuitry 56 is adapted to receive commands from the command signal receiver 30, the manual controls 34, and the clock 42, and to output signals to a display 35, a time/channel programming circuit 40, and input selection switch 43. The random access memory 54 includes a section for the parental control identification code and a section of stack memory for storing the program channels, dates, and times selected for viewing or, alternatively in the case of exclusion, the program channels, dates, and times that are selected for exclusion from viewing or when the TV receiver is not available for use. Either the ID codes section, or the stack memory may be separate from RAM 54. As noted above, the G-code numbering of the programs may be advantageously used to simplify the parental control operation of the television.

Figure 11:
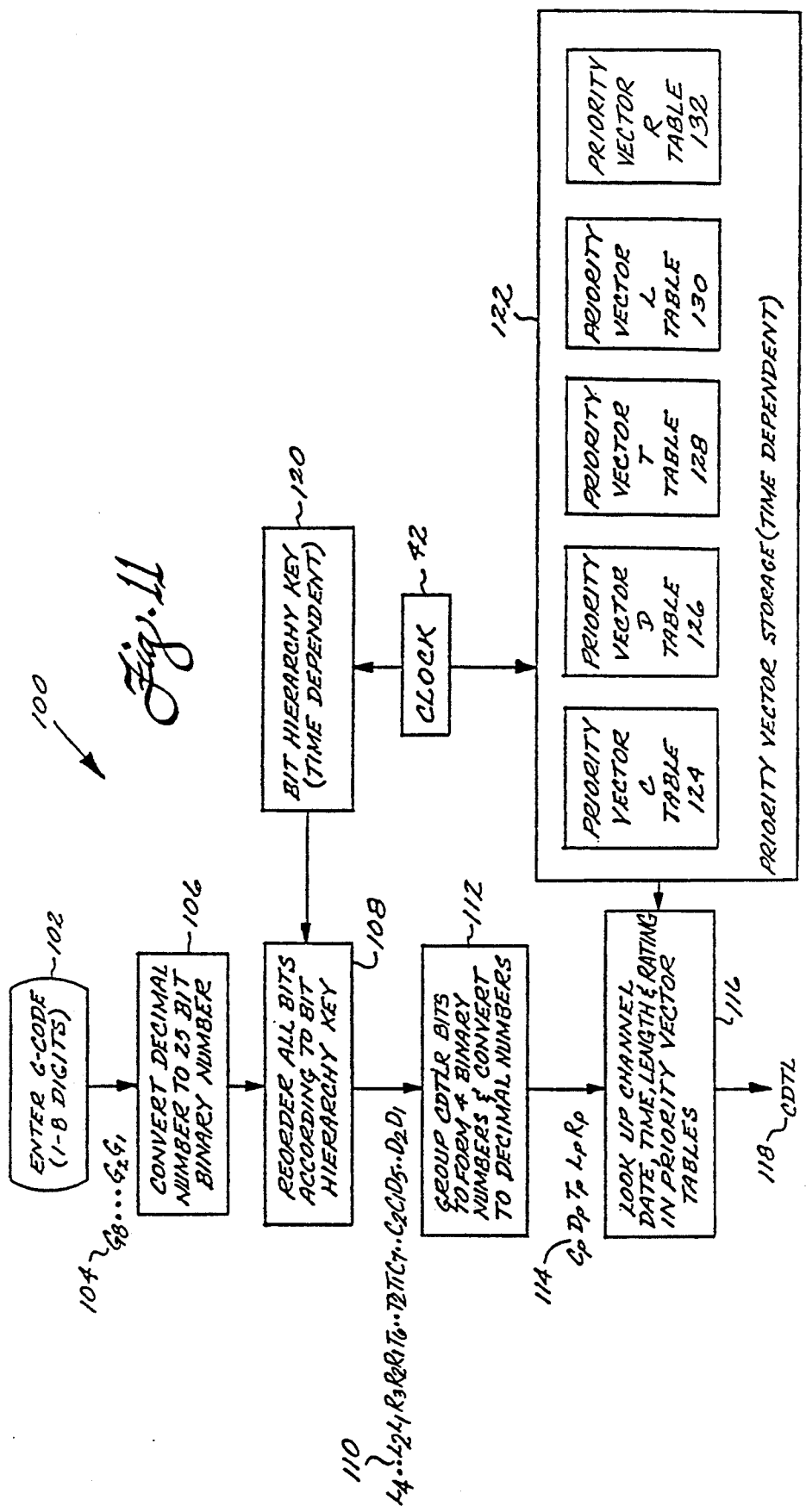
FIG. 11 is a flow graph of the G-code compressed code decoding technique.

In order for the compressed code to be useful, it must be decoded, and apparatus for that purpose must be provided. A G-code compressed code decoder 38 is included in the VCR 11 of FIG. 1 and the TV receiver of FIG. 2. If the command controller 36 determines that a G-code has been received, then the G-code will be sent to the G-code decoder 38 for decoding. The G-code decoder 38 converts the G-code into channel, date, time and length (CDTL) information which is used by the command controller 36 to set the time/channel programming circuit 40 as set forth in the flow chart of FIG. 11. Built into the VCR 11 is a clock 42. This is normally provided in a VCR and is used to keep track of the date and the time. The clock 42 is used primarily for timing the operation of the time/channel programming circuit 40 and the G-code decoder 38. The time/channel programming circuit 40 receives the channel, date, time and length information from the command controller 36. When the proper date and time is read from clock 42, then the time/channel programming circuit 40 and the command controller 36 cooperate to control the input to the TV monitor 48. In the parental control operation, the input selection switch circuit 43 is selectively activated to permit an input from the TV signal input 18 or the record/playback unit 44 or to preclude either or both inputs.

The VCR 11 of FIG. 1 and the TV receiver of FIG. 2 advantageously include a key switch 33 for selecting either the total parental control mode of operation or the normal operation for the unit. For parental control, the key that operates the key switch 33 would need to be kept in a secure place.

Figure 5:
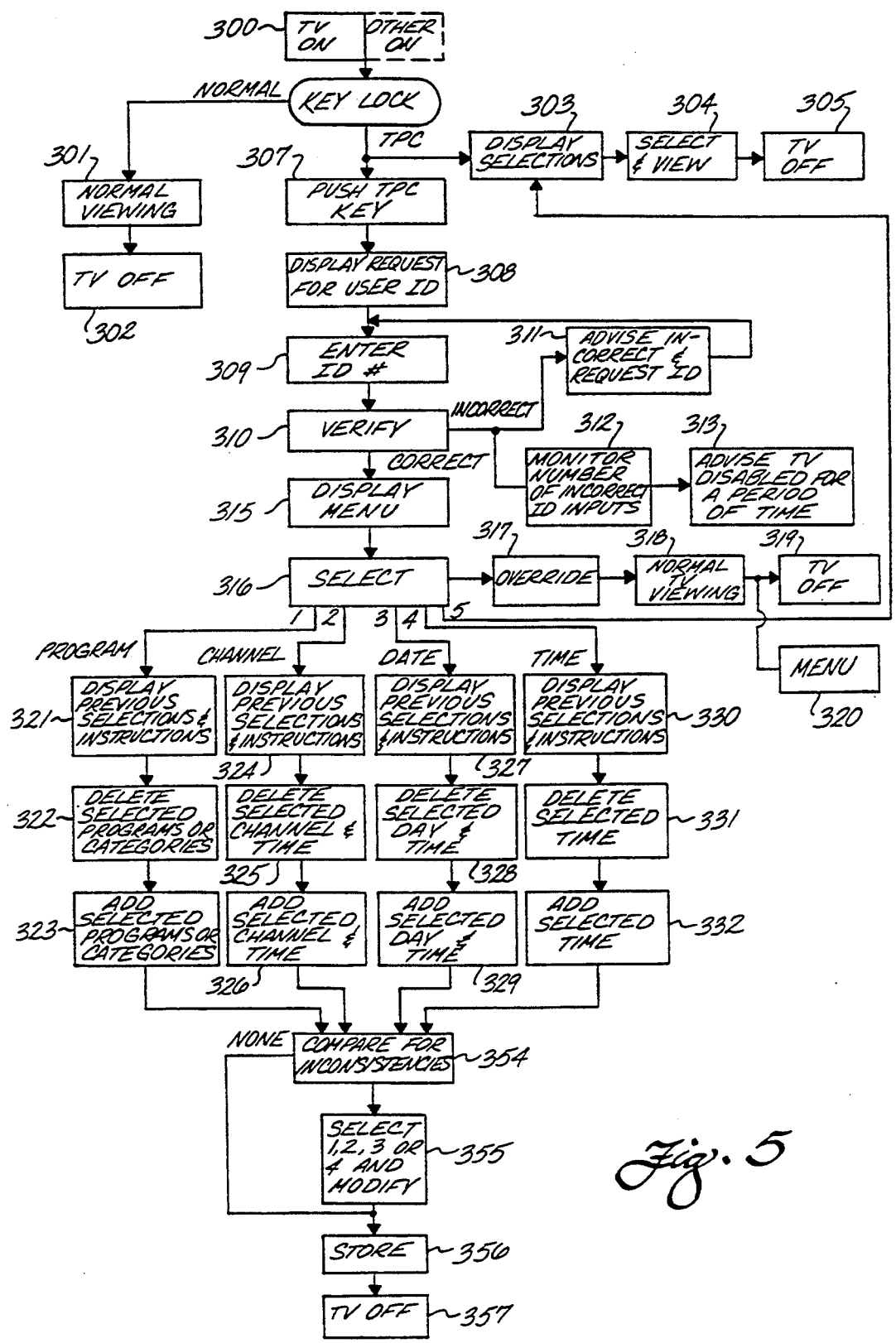
FIG. 5 is a flow-chart of the operation of the apparatus incorporating the parental control in accordance with this invention.

The operation of the VCR 11 of FIG. 1 and the TV of FIG. 2, to provide parental control, may be better understood by reference to the flow chart set forth in FIG. 5. The TV is turned on at step 300, and any other ancillary apparatus, such as VCR 11 in FIG. 1, is also turned on. If the key lock 33 is in the position for normal TV viewing, then the normal viewing of step 301 will be available. After completion of viewing, the TV is shut off (step 302). If the key lock 33 is in the total parental control position, then upon turning on the TV, the selections that are available by inclusion or not available by exclusion will be displayed on the screen as shown in step 303. A representative display of inclusion that would be present in step 303 is shown in FIG. 6. The user of the apparatus may then select one of the programs that is available for viewing in step 304 and, upon completion of viewing, the TV is then shut off in step 305. If the available programs, channels, dates, and/or times are to be modified, then the total parental control key, such as key 29 in FIG. 1, is pushed in step 307.

The pushing of the total parental control key 29 will cause a message to appear on the screen of the TV such as the one shown in FIG. 7 wherein the user is requested to enter his or her identification (ID) code or number. Following the display of the message in step 308, the user enters his or her ID in step 309 by using the numbers of the key pad 20, for example, as shown in the remote controller of FIG. 1. The authorized user ID codes will have been previously stored in the parental control ID section of the RAM 24, as illustrated in FIG. 3. A typical user ID might be 6823 which, when entered, is compared in the verify step 310 under the control of the microprocessor 50 with the authorized parental control IDs stored in the RAM 54. The ID code number is entered by pressing keys numbered 6, 8, 2 and 3 and then the enter key 31. If the ID number that is entered is not an authorized number stored in RAM 54, then the user will be advised in step 311 by a message, such as the message of FIG. 8, displayed on the TV screen that the ID number is incorrect and the inputting of another ID number will be requested. Steps 309 and 310 will, again, take place upon the entry of the new ID number and, if this ID number is again incorrect, the user will again be advised in step 311. Upon the entry of a number of incorrect ID numbers, such as 3, which are monitored in step 312, then the user will be advised in step 313 by a message such as the one shown in FIG. 9 that the ID numbers that have been entered are not authorized ID numbers and that the TV will be disabled for a period of time. The period of time may, for example, be 30 minutes or one hour or whatever may be selected during set up by the authorized user of the equipment.

If in the verification step 310 the user ID code that has been entered is an authorized ID, then in step 315 a menu will be displayed on the TV screen, such as shown in FIG. 10. At the time during set up of entering the ID codes that will be the authorized ID codes, the user may also select whether the parental control operation shall be one of inclusion or exclusion. Assuming that the selection of inclusion has been made, then the menu displayed in step 315 as shown in FIG. 10 will be for inclusion of programs, channels, dates, and times that may be selected for viewing when in the total parental control mode. One or more of the possible selections set forth in the menu of FIG. 10 may be selected in step 316. Instead of changing the programs, channels, date and time under the parental control, the authorized user may, at this point, override the parental control operation by pushing number 6 on, for example, the remote controller 12 of FIG. 1, for normal TV viewing. This will cause the override of step 317 to permit normal TV viewing (step 318) after which the TV will be shut off in step 319 or the menu of FIG. 10 may again be displayed in step 320 by pushing the MENU key 37 shown in FIG. 1.

With the menu displayed on the screen of the television in step 315 or 320, the user need only push one of the numbered keys on key pad 20 to set up the mode for selecting one of the possible selections as shown in the menu of FIG. 10. The pushing of button 1 will permit the selection of programs as illustrated in FIG. 5. Upon pushing button key 1, for example, (step 321), the previous selections that have been made will be displayed along with instructions for making deletions or additional selections.

If programs are to be deleted in step 322, the user activates the cursor by pressing button 25 (FIG. 1), and then moves the cursor on the TV screen displaying the available programs, e.g., as shown in FIG. 10, by use of the up/down keys 17 and 21 and the right/left keys 19 and 23 to the program that is to be deleted. With the cursor highlighting the program to be deleted, the enter key 31 is depressed to complete the deletion of the program from programs that may be viewed. In step 321, programs may, alternatively, be deleted by entering the compressed code, as shown in FIG. 6. For example, if it is desired to delete the program FAMILY TIES, it is only necessary to enter on the keypad 20 the numbers "1-5-6-5-7" and thereafter press the ENTER key 31. This will complete the deletion of FAMILY TIES from the programs available for viewing.

Figure 4:
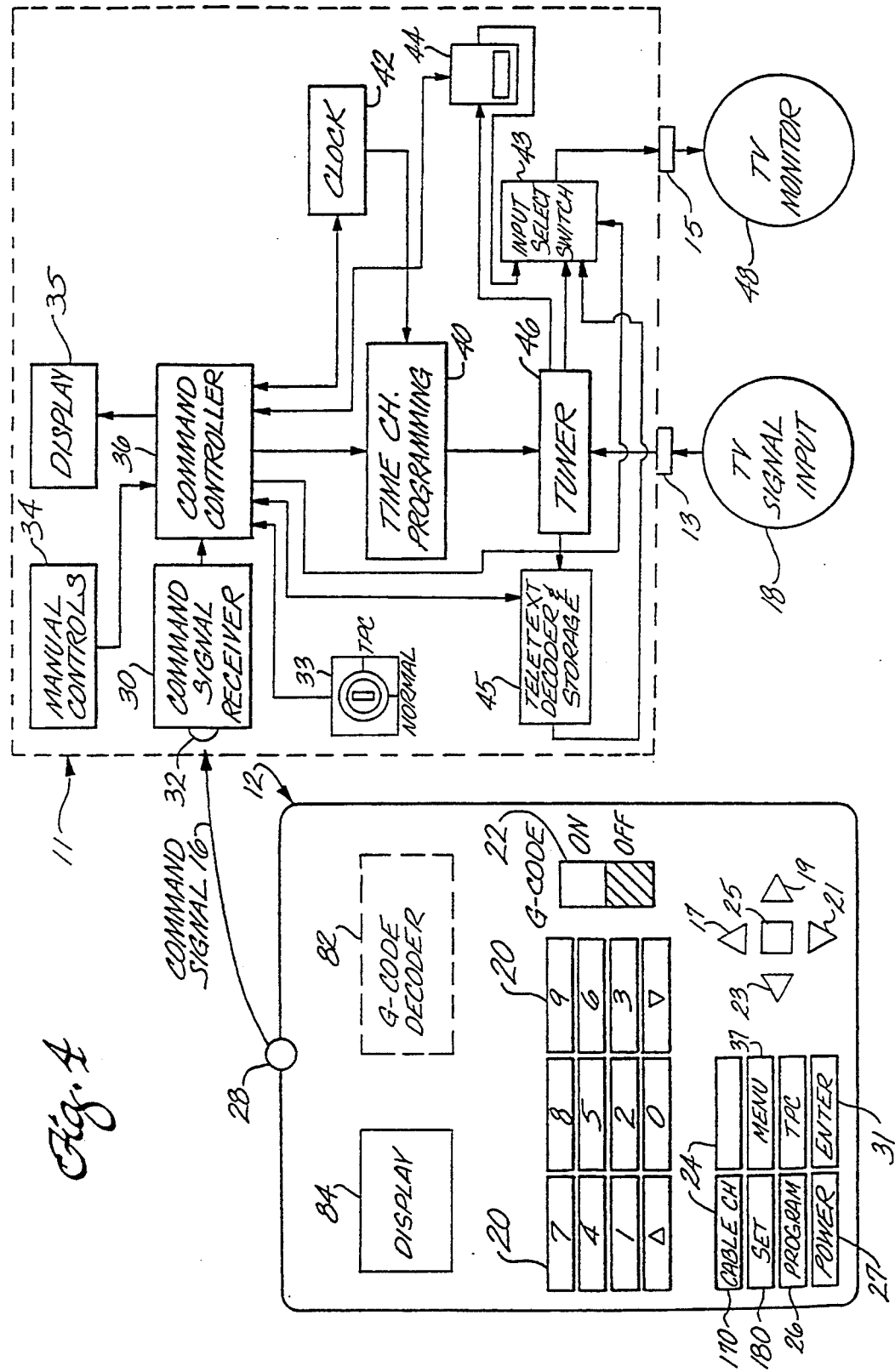
FIG. 4 is a schematic showing the compressed code decoder means embedded in a remote controller.

Similarly, to add one or more programs for viewing in step 323, the compressed code such as the G-code compressed codes that appear with the programs listed in the printed TV schedules may advantageously be employed. The user, on deciding which of the programs listed in the TV schedule to make available for viewing, enters the compressed code for each of these programs by using the keypad 20 on the apparatus or on the remote controller, as shown in FIG. 1, and the enter key 31. The TV schedule may also be made available on a floppy disk, as disclosed in U.S. patent application Ser. No. 07/882,291 filed May 13, 1992 and incorporated herein by this reference as through set forth in full. A floppy disk drive may be incorporated into the controller, the VCR, or the television for reading the TV schedule and displaying same on the screen of the TV. If a floppy disk is used, then programs to be added may be selected by use of the cursor keys shown in FIG. 1 or by entry of the G-code that is listed in the TV schedule retrieved from the floppy disk. Additionally, the TV schedule may be available as part of the TV broadcast signal in the vertical blanking interval of the TV signal or as the video program. When the vertical blanking interval is used to carry the TV scheduling information, it may be retrieved from the TV broadcast signal by a teletext decoder and storage 45 shown in FIGS. 1, 2 and 4 and selected by the input select switch 43 for display on the TV monitor 48. Again, the programs to be added may be selected by use of the cursor keys as shown in FIG. 1, or by entry of the compressed code as described above.

The user may also select channels, dates, and times to be available for use of the TV by pushing buttons 2, 3 or 4 when the menu is being displayed on the TV screen in step 315. Channels, dates, and times may be deleted in the same manner as programs by using the cursor controls 17, 19, 21, 23, and 25, and the entry key 31 when the available channels, dates or times are displayed in steps 324, 327 or 330. It is possible to select a channel that is always available for viewing or to select a channel for viewing at selected times. To make a channel available for viewing at all times, it is only necessary to enter the channel number in step 326 when key 2 has been depressed in the selection step of 316. The period of time that a channel is available for use may be controlled by inserting starting and stopping times in step 326 when the channel number is inserted.

During the selecting process, each selection to be added is stored in temporary memory in RAM 54 and at the completion of the selection process transferred to the stack memory portions of RAM 54 for storage in temporal order. Upon the completion of each selection of program, channel, date, or time, the menu key 37 is depressed to return to step 315 for display of the menu shown in FIG. 10. At any time in the selection process, the key 7 may be depressed while the menu is being displayed to compare the selections that have been made for possible inconsistencies, which is done in step 354. For example, if a program has been selected to be available for viewing and is on a channel that has been excluded for viewing, or is at a time for which viewing is not enabled, this will be noted as an inconsistency. If there are no inconsistencies, then the microprocessor 50 causes the selections to be stored in step 356 in the stack memory portion of the RAM 54. If inconsistencies do exist in step 354, then the program, channel, date, or time that is to be deleted to avoid the inconsistency is selected in step 355 by depressing the appropriate key 1, 2, 3, or 4 and going through the delete step 322, 325, 328, or 331. Once there are no inconsistencies in the selections and the selections are stored in the stack memory portion of RAM 54, then the TV is shut off in step 357.

Figure 12:
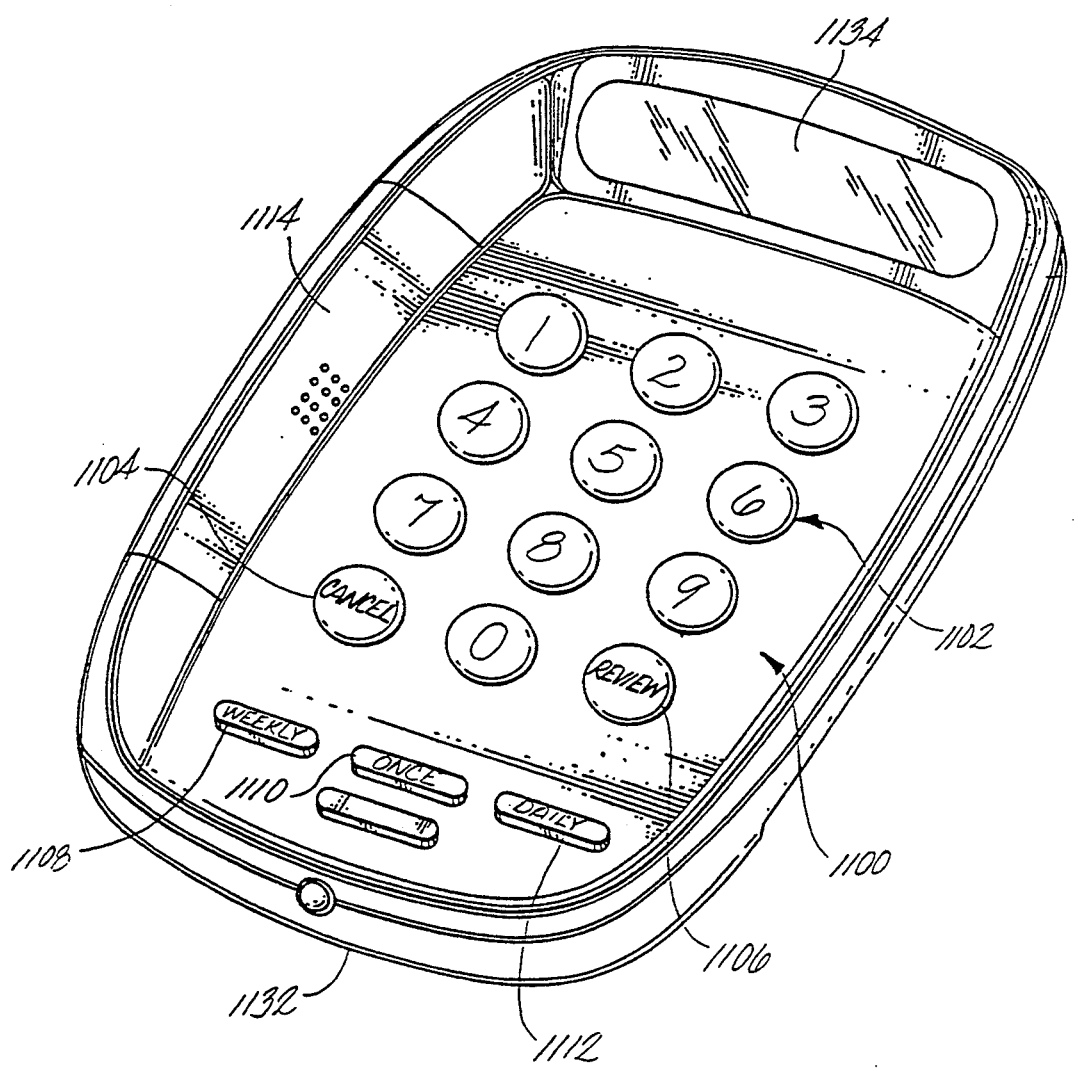
FIG. 12 is a perspective view of an alternative remote controller that includes downloading capabilities for compressed codes.
Figure 13:
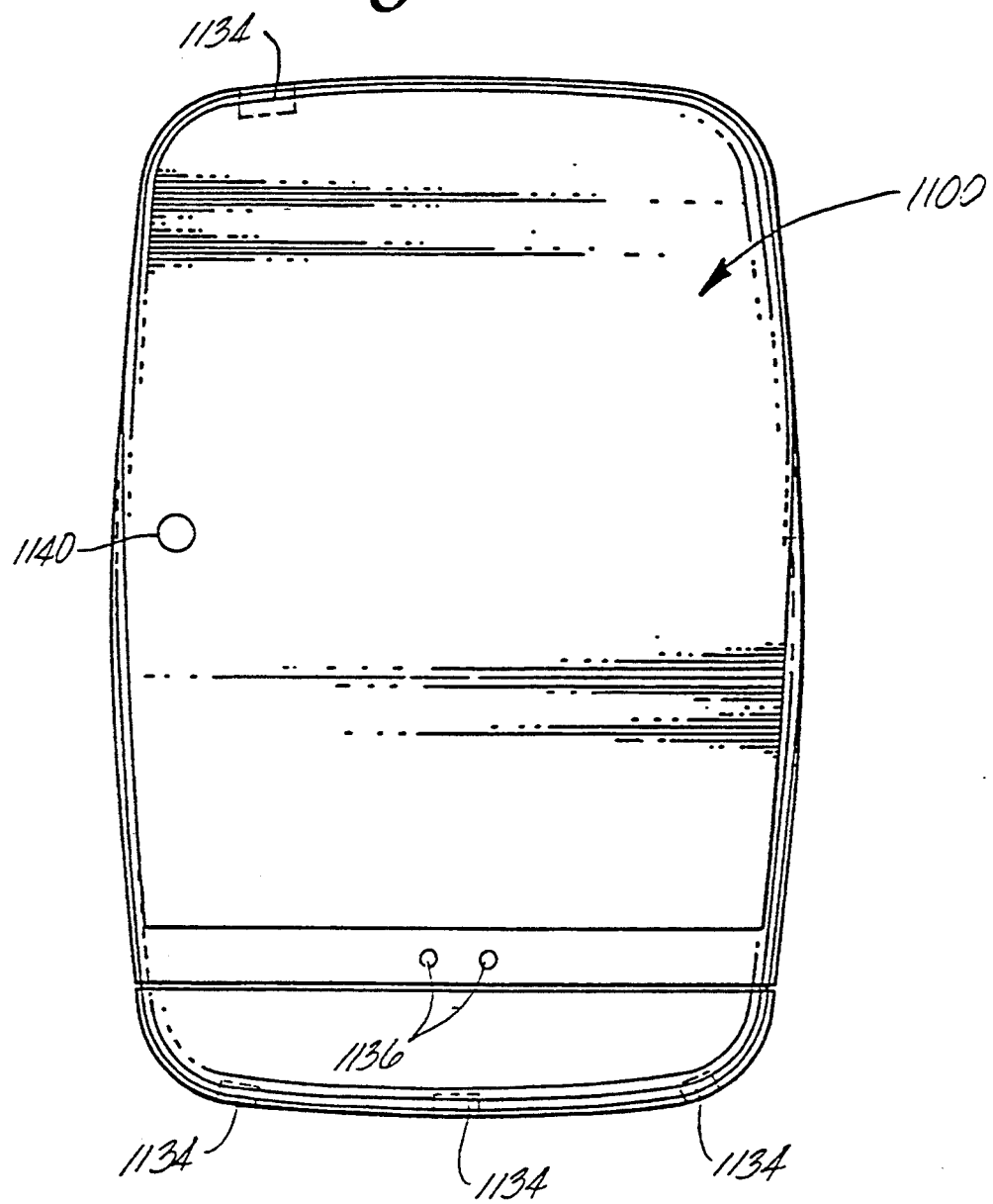
FIG. 13 is a bottom view of the apparatus of FIG. 12 showing a microphone hole and two electrical contact holes.

Another preferred embodiment of an apparatus for using compressed codes for parental control is the custom remote controller 1100 of FIGS. 12 and 13. This programmer, other programmers, and particularly universal remote control programmers, are disclosed in detail in U.S. patent application Ser. No. 08/000,934 filed Jan. 5, 1993, which application is incorporated herein by this reference as though set forth in full. The custom remote 1100 has number keys 1102, which are numbered 0–9, a CANCEL key 1104, a REVIEW key 1106, a WEEKLY key 1108, a ONCE key 1110 and a DAILY (M-F) key 1112, and which are used to program the custom remote 1100. A lid normally covers other keys, which are used to set up the instant custom remote 1100. When lid 1114 is lifted, the following keys are revealed, but not shown in the drawings: SAVE key, ENTER key, CLOCK key, CH key, ADD TIME key, VCR key, CABLE key, and TEST key. Also included in the custom programmer 1100 shown in FIG. 12 are: liquid crystal display 1134, red warning light emitting diode 1132 and IR diodes 1134.

When using the instant remote 1100, the consumer initially performs a set-up sequence, consisting of selecting a protocol for the model/brand of VCR, setting the current real time, selecting a protocol for the model/brand of cable box, if used, and entering a series of channel number assignments. Although the instant remote 1100 makes selections of programs to be included or excluded and the recording of television programs extremely simple, the initial set-up sequence for the instant remote 1100 is more complex and deters the use of the instant remote by some consumers. For increased ease of use, custom remote 1100 includes a microphone opening 1140 through which at least one microphone inside the custom programmer 1100 can receive electronically coded audio signals that contain the information necessary for the custom remote's initial set-up and commands to store this information into the custom remote 1100.

In order to receive these audio signals, a user may call a special phone number which could be a toll-free 800 number, a pay-per-minute 900 number, or a standard telephone number with standard toll charges applying. The consumer can speak to an operator who orally inquires from the consumer the information regarding the consumer's VCR model and brand, zip code, model and brand of cable box and the newspaper or other publication which the consumer will use to obtain the compressed codes. The compressed codes with the associated program in a television schedule format may be retrieved from disk, rather than the newspapers or other publication, as disclosed in U.S. patent application Ser. No. 07/882,291 filed May 13, 1992, which is incorporated herein by this reference as though set forth in full. This is all the information needed to perform the initial set-up for the custom remote 1100. From the zip code information, the operator can determine to which cable system the consumer is connected and can combine this data with the knowledge of which publication or disk the consumer will use to select the correct local channel mapping table for the consumer.

The operator then directs the consumer to press a designated programming key which is, in the case of the preferred embodiment, the CH key located under lid 1114. When the CH key is pressed, the display 1134 will display the message "PHONE1 KEY2". Pressing the "2" numeric key places the custom remote into the manual local channel table programming mode that is implemented by instant remote 1100 when CH key under lid 1114 is pressed. Pressing the "1" numeric key initiates the remote programming mode. The remote programmer 1100 is then ready to receive an audio signal and display 1134 displays the message "WAIT".

Figure 14:
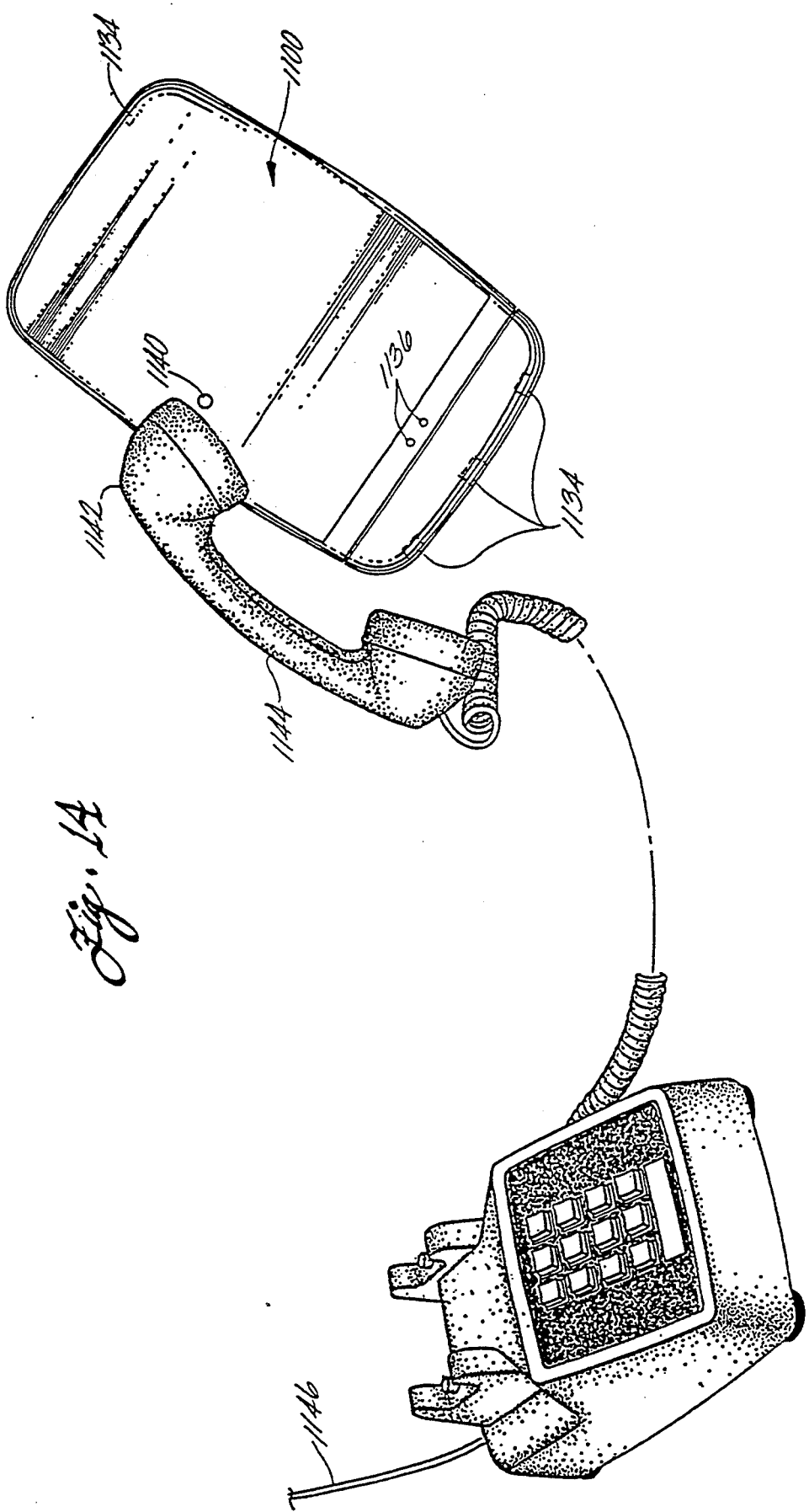
FIG. 14 shows the controller of FIG. 12 being used in conjunction with a telephone.

The operator will then direct the consumer to place the earpiece 1142 of the telephone receiver 1144 over the microphone opening 1140 of the custom remote 1100 as generally shown in FIG. 14. The earpiece need not be placed directly against the custom remote 1100, but may be held more than an inch away from the microphone opening with generally satisfactory results. After a pause sufficient to allow the consumer to place the telephone receiver in the proper position, the operator will initiate the downloading of the initial set-up data and initial set-up programming commands transmitted over the telephone line 1146 using audio signals to the consumer's custom remote 1100.

If the initial set-up data is successfully transferred to the custom remote 1100, the display 1134 of the custom remote 1100 will display the message "DONE". If the reception of the initial set-up data is not successful within a predetermined time limit, red warning light emitting diode 1132 will blink to inform the consumer to adjust he position of the telephone earpiece before another download of the information is attempted. After a waiting period allowing this adjustment, the initial set-up data and commands are re-transmitted over the telephone line. If after a predetermined number of attempts to download the initial set-up information are unsuccessful, the liquid crystal display 1134 displays the message "FAIL" and the operator is again connected to the consumer allowing the operator to speak to the consumer to provide additional assistance in the positioning of the telephone earpiece.

Alternatively, a live operator could be provided by the local cable company and the initial set-up information downloaded to the custom remote 1100 by telephone line, through the existing cable of the cable system, or any other transmission means. If local cable companies supply the live operators, the only information they would need to gather from the consumer would be the VCR brand and model and the publication or disk containing compressed codes that the consumer plans on using, because the local cable company would know the model and brand of cable box installed at the consumer's location and the necessary data regarding the local channel designations for that cable system.

Figure 15:
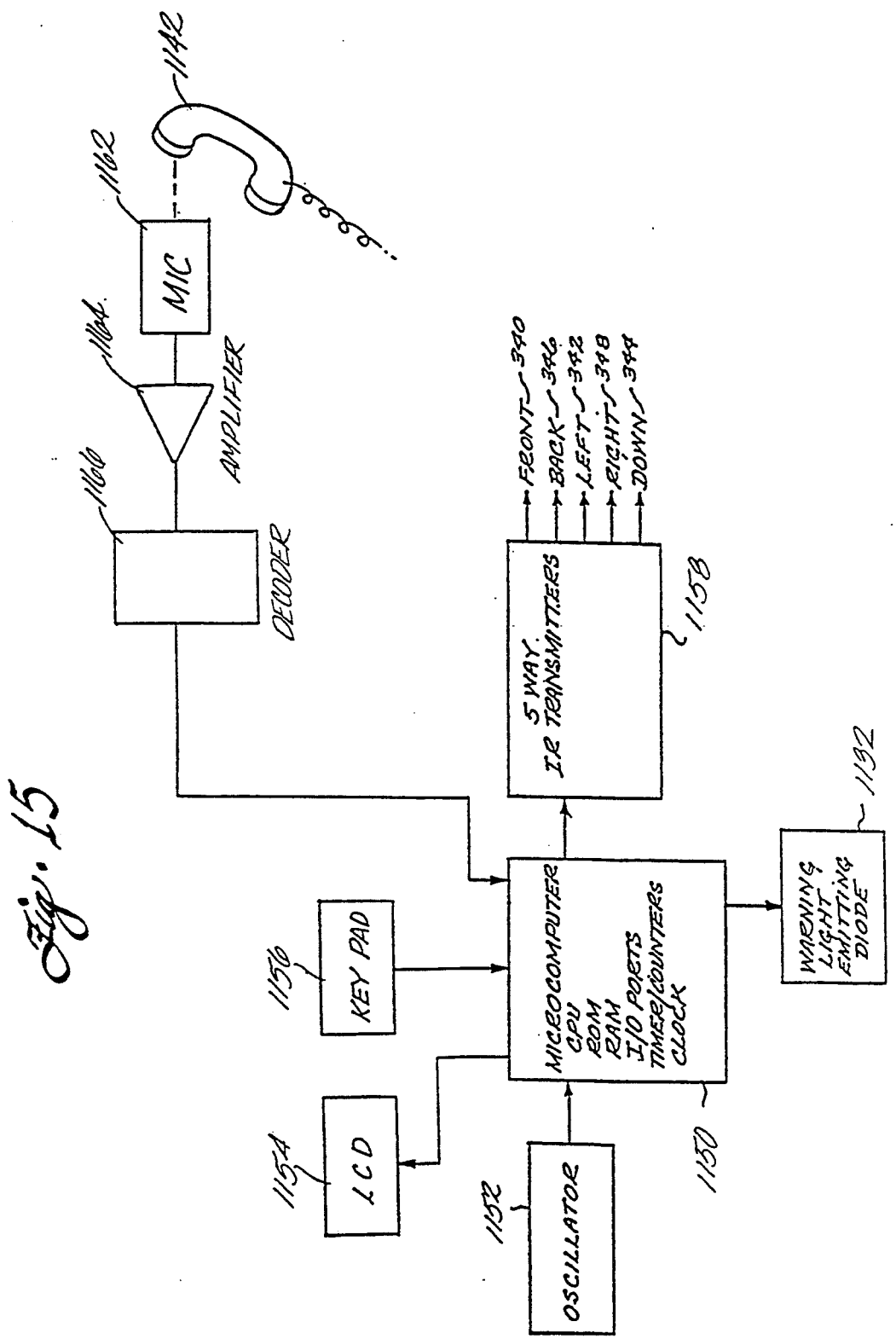
FIG. 15 is a block diagram of the components within the controller of FIG. 12.
Figure 16:
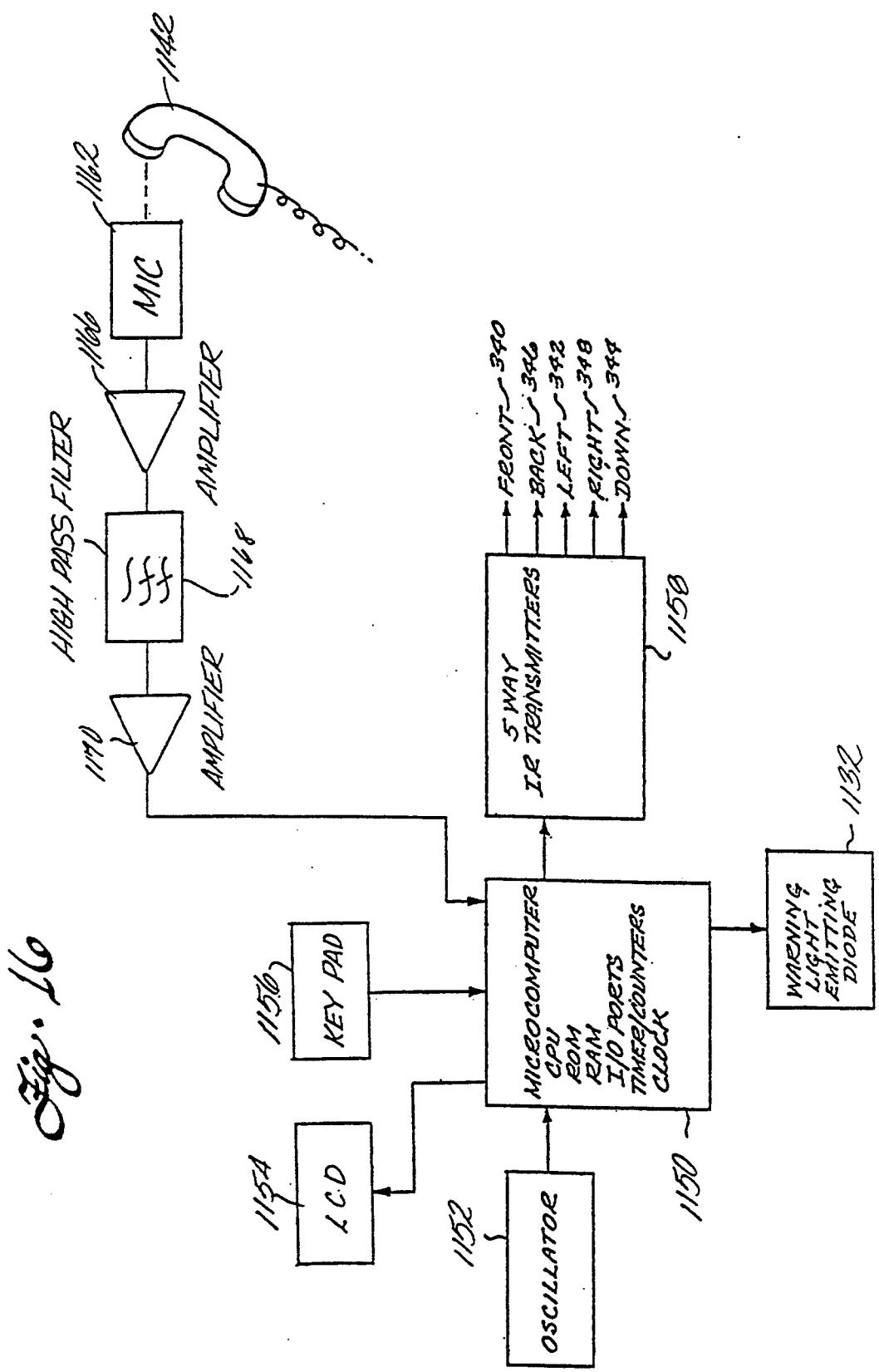
FIG. 16 is a block diagram of alternative components for the controller of FIG. 12.

FIGS. 15 and 16 are schematics of the circuitry needed to implement alternative embodiments of the custom remote 1100. The circuit consists of microcomputer 1150, oscillator 1152, liquid crystal display 1154, keypad 1156, five way IR transmitters 1158 and red warning light emitting diode 1160. In both FIGS. 15 and 16, earpiece 1142 generates serial audio signals which are received by microphone 1162.

As shown in FIG. 15, the audio signals received by microphone 1162 are passed through amplifier 1164 and forwarded through a DTMF decoder circuit 1166 and into a serial port of microcomputer 1150. In the alternative circuit shown in FIG. 16, the audio signals received by microphone 1162 are passed through amplifier 1164, through a high pass filter 1168 with a cutoff at approximately 1–5 kHz, and through a second amplifier 1170 to a serial port of microcomputer 1150.

The control and/or date signals are sent to the associated apparatus such as VCR 11 of FIG. 1 or the television of FIG. 2 through one or more of the IR transmitters 1158.

Alternatively, a dual microphone system (not shown) may be employed to increase reliability, especially when the custom remote 1100 is to be programmed in an environment with a high level of background noise that could interfere with the transmission of data through the single microphone acoustic means. In this system, one microphone would be placed near the telephone earpiece and the second microphone would be placed some distance away from the earpiece in order to pick up background noise. An audio signal cancellation circuit is then used to effectively "subtract" the background noise picked up by the second microphone from the audio data signals combined with the background noise that is picked up from the first microphone, resulting in solely clean audio data signals.

Preferably, the microphone and encoding assembly in FIG. 16 is used as it is less expensive than the assembly in FIG. 15 that uses a DTMF decoder 1166. The system shown in FIG. 16 utilizes just two single frequency signals rather than many dual frequency signals as in a DTMF system. The first signal, a tone of approximately 3000 Hz, is used to signify a binary "one" and the second signal, a tone of approximately 500 Hz, is used to signify "zero". Since a 500 Hz signal is being used in this embodiment, the bandwidth of the 1000–5000 Hz high pass filter 1168 FIG. 16 is designed to accommodate these frequencies.

If the exclusion mode has been selected by the user during the set up of the system then the selection steps shown in FIG. 5 will result in programs, channels, dates and times that are excluded rather than included with the operation of the system being essentially the same for exclusion as for inclusion.

To further simplify the programming of the system, the TV programs are advantageously categorized and the categories given a compressed code or G Code compressed code for use in programming the apparatus. For example, a service may be accessed by use of the pay per use 900 number system and the compressed code numbers for selected categories of programs requested. For example, a user might call the 900 number and request the compressed code numbers for all Yankee baseball games in the coming week or for particular movies that include a particular actor or actress, such as John Wayne, and so forth. Also for parental control, the user might call the 900 number and request the compressed control numbers for all shows rated appropriate for a child of a certain age, then when a custom remote such as remote 1100 is used the compressed code for the requested categories of programs can be transferred over the telephone lines and downloaded into the memory of the system, such as the RAM 54 shown in FIG. 3. Thereafter, as shown in FIG. 5 the user in steps 322 and 323 may use the compressed codes for the selected categories to either delete or add programs for inclusion or for exclusion. Any of the other programmers 300, 1200 and 1300 disclosed in U.S. application Ser. No. 08/000934 may be used in downloading the compressed code for categories for parental control.

Figure 17:
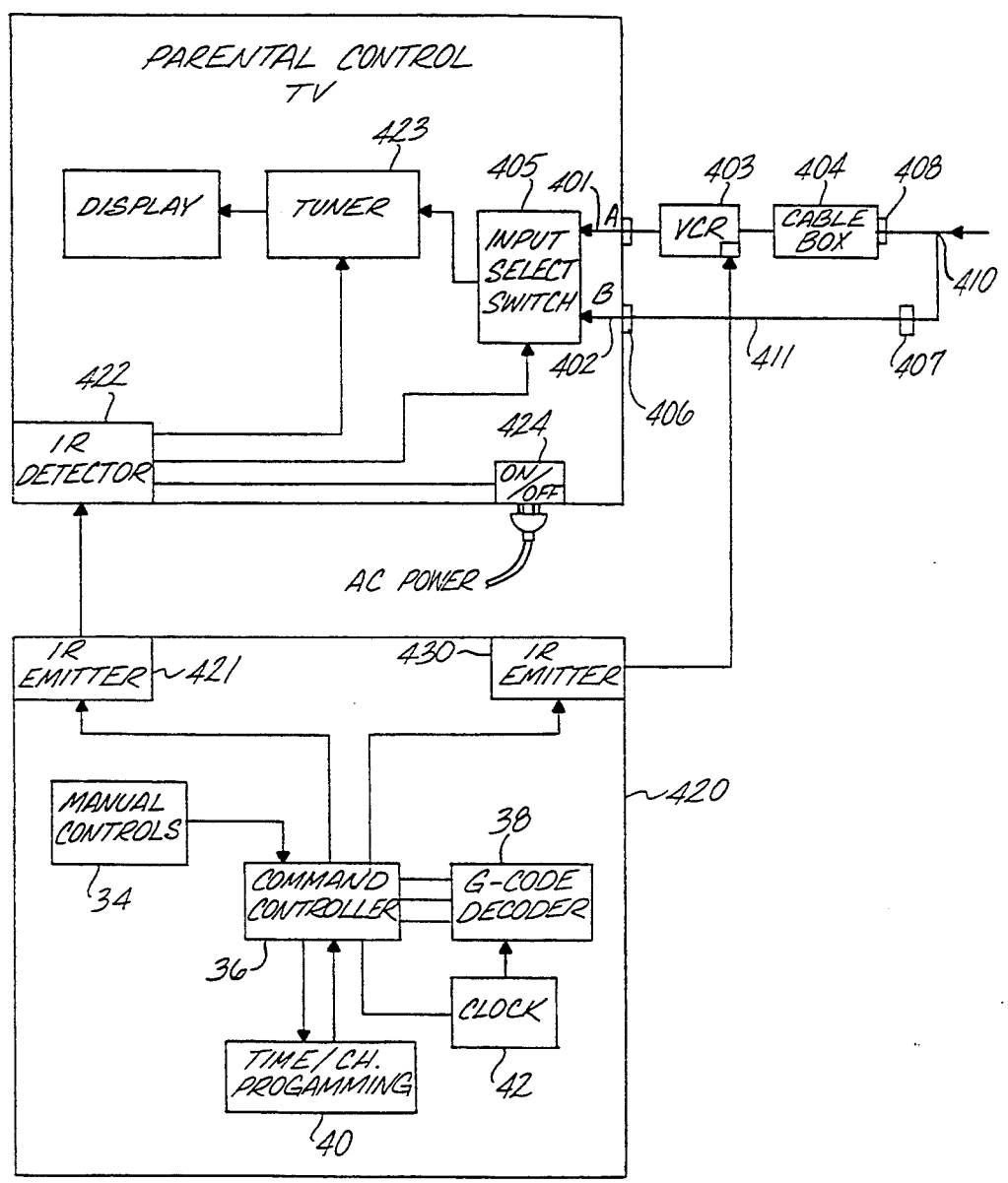
FIG. 17 is a schematic showing apparatus according to this invention with a television receiver having a parental control input terminal and control.

Parental control may also permit viewing of only those channels that do not require conversion by a cable box, such as the premium channels typically require, and to preclude the viewing of tapes. Such a system is shown in FIG. 17.

There are two possible inputs to the parental control TV 400 which are inputs 401 and 402. Input 401 is the normal input through a VCR 403 which permits normal viewing of all channels and use of the VCR for playing tapes. This normal viewing input may come directly from a cable box or a satellite box without the VCR. The second input 402 is the parental control input which precludes the use of the VCR for viewing tapes and/or the tuning by the cable box, or satellite box and returns the tuning to the TV 400.

VCR 403 and a cable box 404 are connected in series between the cable input and the input 401 to the TV 400. An input select switch 405, internal of the TV 400, selects either the regular input on terminal 401 or selects the parental control input on input 402. In the parental control connection, tamper-proof or locking connectors 406 and 407 are employed at the two ends of the coaxial cable to prevent tampering or the use of any source other than the cable source as shown in FIG. 17.

A third locking connector 408 is employed at the input to the cable box as part of the means for preventing connection to a source other than the cable source. The locking connectors may be located at the T 410 rather than at the input to the cable box 404 and at the end of the co-ax cable 411.

The TV 400 may be controlled through a remote controller 420 or through manual controls located on the TV 400. When the TV is controlled from a remote controller 420, the controller may be coupled to the TV through an IR link or through cabling. When an IR link is used, there will be an IR emitter 421 in the controller 420 and an IR detector or receiver 422 in the TV 400.

The control signals for controlling the tuner 423, the input select switch 405, and an on/off switch 424 in the TV 400 are sent from the remote controller 420 to the TV receiver 400 through the IR link. The remote controller 420 includes a command controller 36 that has a microprocessor and appropriate memories such as those shown in FIG. 3. The controller also includes manual controls 34, such as those shown on the controller 12 of FIG. 1.

The controller 420 provides control signals to control the input select switch so that the input to the TV 400 is either the regular channel input through the VCR and cable box or the input through the parental control coaxial cable 411. Alternatively, the controller 420 may also include the circuitry of FIGS. 1-4 for providing the ability to include or exclude selected channels, dates, times or programs, as described above in connection with those figures. For this purpose, the G-code decoder 38, clock 42 and time channel programming circuit 40 are included in the controller 420 and operates as described above.

The controller 420 may also include an IR emitter 430 for transmitting control signals from the controller 420 to the VCR 403 for controlling recording of selected programs by the VCR.

In operation the parent enters a designated code by use of the control 34 on controller 420 or on the TV 400 to cause the command controller to send a control signal to the input select switch over the IR link. This control signal causes the switch to connect input 402, the parental control input, to the tuner 423. Thereafter, the tuning is done at the TV either with or without further restrictions by previous limitations of inclusion or exclusion. Thereafter, the parent, enters another code to cause the switch 405 to connect input 401 to the tuner 423 for normal TV receiving.

While the invention as been described and preferred embodiments disclosed, it is anticipated that other modifications and adaptations will occur to those skilled in the art. It is intended, therefore, that the invention be limited only by the claims appended hereto.

What is claimed is:

1. An apparatus for parental control of television use comprising:
   a television receiver having a display monitor;
   parental control circuitry in the television receiver including a command controller comprising a microprocessor coupled to a memory for storing authorized identification numbers, and a memory for storing titles of selected programs, channels, and times;
   means for entering an identification number into the command controller and for entering said titles of selected programs, channels, and times into the command controller, the entered selected programs being stored into the memory for storing titles of selected programs channels, and times;
   means for verifying that an entered identification number compares with a stored authorized identification number;
   means for the command controller to display on the display monitor a listing of the selected programs, channels, dates, and times;
   means for reordering of said selected programs, dates, and times into temporal order when each selected program date and time are entered so that the selected dates and times are ordered in time from earliest in time to latest in time; and
   means for storing the temporally ordered selected dates and times.

2. The apparatus of claim 1 further comprising:
   means for comparing the dates and times of selected programs to determine any inconsistencies in the dates and times of the selected programs;
   means for displaying any inconsistencies; and
   means for correcting the inconsistencies.

3. The apparatus of claim 2 wherein said means for entering comprises a television remote controller.

4. The apparatus of claim 2 wherein said means for entering comprises manual controls attached to said television receiver.

5. The apparatus of claim 1 further comprising:
   a clock having an output as a function of time located in the television receiver and coupled to the command controller;
   means for comparing the date and time of the stored selected program that is earliest in time to the output of the clock for a predetermined relationship;
   means for generating a television available signal upon the occurrence of the predetermined relationship;
   means for channel selection; and
   means for transmitting the channel information of the selected program or the selected channel to the channel selection means after the predetermined relationship is found to exist.

6. The apparatus of claim 5 further comprising:
   means for measuring the length of time from the occurrence of the television available signal; and means for terminating the television available signal after a selected period of time as determined from the stored program date or time.

7. The apparatus of claim 5 further comprising means for deleting the earliest program, date, or time from the storage means upon the occurrence of the predetermined relationship.

8. The apparatus of claim 5 wherein said means for channel selection comprises a cable box.

9. The apparatus of claim 5 wherein said means for channel selection comprises a satellite receiver.

10. The apparatus of claim 1 further comprising
means for entering into said command controller compressed codes, having at least one digit and each representative of and compressed in length from the combination of channel, date, time, and length commands for a program; and
means for decoding each compressed code into channel, date, time, and length commands coupled to said television receiver.

11. The apparatus of claim 1 which further comprises means for substituting a local channel number for a channel number in said channel command.

12. The apparatus of claim 1 wherein the means for verifying that an entered identification number compares with a stored authorized identification number further comprises:
a first output being responsive to a correct entered identification number to display a menu on the screen of the television receiver to provide for selection of programs, channels, dates, or times; and
a second output being responsive to an incorrect entered identification number to disable the television receiver for a selected period of time if a plurality of incorrect identification numbers are entered.

13. A method of controlling the programs, channels, dates, and times available for viewing on a television receiver, the method comprising the steps of:
entering a user identification code;
verifying that the entered user identification code is an authorized code;
displaying a menu from which programs, channels, dates, and times may be selected for inclusion in a list of programs, channels, dates, and times available for viewing on the television receiver;
selecting one or more of the programs, channels, dates, and times for establishing each of the programs, channels, dates, and times for which the television receiver is available;
entering the titles of selected programs with their channel and time into temporary storage;
comparing the entered dates and times of entered programs and dates and times for any inconsistencies in the selected programs, channels, dates, and times;
removing any inconsistencies; and
storing the selected programs, channels, dates, and times for controlling the availability of the television receiver.

14. The method of claim 13 wherein the step of selecting programs further comprises the steps of:
entering compressed codes, each having at least one digit and each representative of the combination of channel, date, time of day, and length commands for a program;
decoding each compressed code to obtain channel, date, time of day, and length commands;
storing each such channel, date, time of day, and length command into the temporary storage.

15. The method of claim 14 further comprising the steps of retrieving compressed codes for selected categories of programs and entering one or more of the category compressed codes for selecting categories of programs for viewing on the television receiver.

16. A system for parental control of television use comprising:
a television receiver having a controllable input select switch and first and a second input terminals;
a video cassette recorder having a device output coupled to the first input terminal and a device input coupled to a signal source;
a coaxial cable connected to the second input terminal and connected to the signal source bypassing the video cassette video cassette recorder;
locking connectors at the two ends of the coaxial cable to prevent removal;
a locking connector coupling the video cassette recorder to the signal source; and
means for controlling the input select switch in response to a user command to select the first input terminal coupled to the video cassette recorder or the second input terminal that bypasses the video cassette recorder;
wherein upon a user command the video cassette recorder is bypassed.

17. The system of claim 16 further comprising a cable converter apparatus coupled to the video cassette recorder wherein upon a user command the cable converter apparatus is bypassed.

* * * * *

UNITED STATES PATENT AND TRADEMARK OFFICE
CERTIFICATE OF CORRECTION

PATENT NO. : 5,382,983
DATED : January 17, 1995
INVENTOR(S) : Daniel S. Kwoh; Roy J. Mankovitz It is certified that error appears in the above-indentified patent and that said Letters Patent is hereby corrected as shown below:

Column 3, line 15, change "FIG, 17" to -- FIG. 17 --.

Column 7, line 15, change "through" to -- though --.

Column 9, line 32, after "adjust" change "he" to -- the --.

Column 10, line 35, after "1168" insert -- in --.

Column 14, line 29, before "second" delete "a".

Column 14, line 35, delete "video cassette" (second occurrence).

Signed and Sealed this

Twenty-sixth Day of September, 1995

Attest:

BRUCE LEHMAN

*Attesting Officer*     *Commissioner of Patents and Trademarks*